(12) United States Patent
Rothamel et al.

(10) Patent No.: US 7,377,164 B2
(45) Date of Patent: May 27, 2008

(54) METHOD OF AND APPARATUS FOR BALANCING A VEHICLE WHEEL

(75) Inventors: Karl Rothamel, Ober-Ramstadt (DE); Burkhard Merg, Bickenbach (DE); Gerhard Rossteuscher, Bodolz (DE)

(73) Assignee: Snap-On Equipment GmbH, Pfungstadt (DE)

( * ) Notice: Subject to any disclaimer, the term of this patent is extended or adjusted under 35 U.S.C. 154(b) by 373 days.

(21) Appl. No.: 11/103,648

(22) Filed: Apr. 12, 2005

(65) Prior Publication Data
US 2005/0241393 A1   Nov. 3, 2005

(30) Foreign Application Priority Data
Apr. 13, 2004   (DE) .................. 10 2004 017 767

(51) Int. Cl.
*G01M 1/16*   (2006.01)
(52) U.S. Cl. .......................................... 73/462; 73/460
(58) Field of Classification Search ................... 73/462
See application file for complete search history.

(56) References Cited

U.S. PATENT DOCUMENTS

| | | | | |
|---|---|---|---|---|
| 3,911,751 | A | * | 10/1975 | Shooter et al. ............... 73/464 |
| 4,014,139 | A | * | 3/1977 | Shooter et al. ............... 451/67 |
| 6,708,563 | B2 | * | 3/2004 | Rothamel et al. ............ 73/460 |
| 7,117,738 | B2 | * | 10/2006 | Miyagawa et al. ....... 73/290 V |

* cited by examiner

*Primary Examiner*—Hezron E. Williams
*Assistant Examiner*—Samir M. Shah
(74) *Attorney, Agent, or Firm*—McDermott Will & Emery LLP

(57) ABSTRACT

In a method and apparatus for balancing a vehicle wheel, the wheel when fixed to a main shaft of a balancing machine, after the implementation of a wheel unbalance measuring run, is stopped at a given rotational angular position for a balancing operation to be carried out on the wheel, by braking of the rotary movement of the wheel. When the wheel is in the stopped condition, a braking moment derived from the unbalance measurement result and applied by a holding brake is caused to act on the wheel so that the wheel is prevented from rotating of its own accord by virtue of its static unbalance.

14 Claims, 1 Drawing Sheet

METHOD OF AND APPARATUS FOR BALANCING A VEHICLE WHEEL

CROSS-REFERENCES TO RELATED APPLICATIONS

This application claims the priority of German patent application Serial No 10 2004 017 767.8 filed Apr. 13, 2004, the subject-matter of which is incorporated herein by reference.

FIELD OF THE INVENTION

The invention generally concerns a method of balancing a vehicle wheel and an apparatus for balancing a vehicle wheel.

BACKGROUND OF THE INVENTION

In a typical method of balancing a vehicle wheel such as a motor vehicle wheel, the wheel to be balanced is fixed to the main shaft of a balancing machine and driven in rotation by the shaft to carry out an unbalance measuring run. After the unbalance measuring run is concluded, the wheel to be balanced, in dependence on measurement results supplied in the unbalance measuring run by a measuring device, is stopped in a given angular position for a balancing operation to be carried out, by suitable deceleration of the wheel. The wheel-braking operation can be effected for example by reversing the actuation of an electric motor which serves to drive the main shaft in the measuring run. Such a method and an apparatus for carrying out the method are to be found in DE 198 44 975 C2. Methods and devices for stopping a wheel to be balanced, in a given angular position, are also described for example in DE 101 60 955 A1, DE 196 36 267 C2 and DE 196 36 298 C2.

A conventional balancing machine, for stopping or locking the main shaft which carries the wheel to be balanced, together with the wheel fixed thereon, in the rotary position which is intended for carrying out the wheel balancing operation, usually has holding brakes which are actuated by a foot pedal or by hand. When the foot pedal or a hand-actuated operating button is released, for example if the operator has to move away from the balancing machine, there is then the risk that the wheel will rotate of its own accord out of the rotary position into which it has been rotated for carrying out the balancing operation, by virtue of the effect of the static unbalance of the wheel. The static unbalance forms on the wheel a heavy location which therefore tends to rotate the wheel into the 6 o'clock position. This means that, when the operator returns to the balancing machine, he is required in any case to check the position of the wheel to see whether it has rotated autonomously in the above-indicated manner, and in most cases he is required to correct the position of the wheel. In addition, when the apparatus has a mechanical holding brake which is to be operated by the operator, there is the risk of the operator actuating the holding brake during the phase in which the wheel is decelerated from the rotary speed at which it rotates in the unbalance measuring run, to the stopped condition, in order to shorten the braking time. This means that the holding brake which is not designed to carry out that deceleration operation suffers rapid wear and quickly becomes useless.

SUMMARY OF THE INVENTION

An object of the present invention is to provide a method of balancing a vehicle wheel in which the wheel to be balanced is held in a rotational angular position intended for a balancing operation, without being influenced by the operator.

A further object of the invention is to provide a method of balancing a vehicle wheel which affords a simplified operating procedure in terms of making the transition from the unbalance measuring run to a wheel-stopped condition for a balancing operation to be performed thereon.

Still another object of the present invention is to provide an apparatus for balancing a vehicle wheel which simplifies the operating procedures to be implemented by an operator of the apparatus.

In accordance with the present invention in the method aspect the foregoing and other objects are attained by a method of balancing a vehicle wheel wherein after an unbalance measuring run the wheel which is fixed to a main shaft of a balancing machine is stopped in a given rotational angular position for a balancing operation to be carried out, by deceleration of the rotary movement of the wheel. When the wheel is in the stopped condition, after the unbalance measuring operation, the wheel is subjected to the effect of an automatic holding braking moment which is produced by the electronic system of the balancing machine and which prevents the wheel from rotating of its own accord by virtue of its static unbalance.

Further in accordance with the invention, the foregoing and other objects are attained by an apparatus for balancing a vehicle wheel comprising a main shaft on which a wheel to be balanced can be fixed, a measuring device for measuring unbalance of the wheel, an evaluation device for evaluating the measurement results of the measuring run, to determine the balancing operation to be carried out on the wheel, a drive device for driving the wheel in rotation and for decelerating same, and a holding brake for holding the wheel in a given rotational angular position after a measuring run. The apparatus further includes a control device which detects when the main shaft of the apparatus is in a stopped condition after an unbalance measuring run and which produces a holding braking moment for the holding brake of a magnitude such that the wheel is prevented from rotating of its own accord, under the effect of its static unbalance.

In accordance with a preferred feature of the invention the absolute value of the holding braking moment is less than a torque which can be applied by hand and with which the wheel can be rotated out of the stopped position constituting the position for carrying out the balancing operation on the wheel, which can be referred to as the rotational balancing position. In that way it is possible for the operator to manually move the wheel which has been held in the stopped condition by the holding braking moment acting thereon, into another position, for example into a second rotational balancing position in which a further balancing operation is to be carried out on the wheel. Advantageously, the holding braking moment also acts on the wheel, in that second rotational balancing position. In that way it is possible for the wheel to be dynamically balanced in first and second rotational balancing positions in which it is held in a stopped condition by the braking moment applied in accordance with the invention.

As indicated above, to produce the braking moment of the holding brake, there is a control device which, when the main shaft of the balancing apparatus is detected as being in a stopped condition, after an unbalance measuring run, actuates the holding brake to produce the holding braking moment. The control device is preferably a component part of the electronic evaluation system of the balancing machine, in which the measurement results obtained in the unbalance measuring procedure are evaluated for the purposes of determining balancing values to be applied to the wheel for balancing thereof. The control device supplies a control signal for forming the holding braking moment, the magnitude of which is preferably determined from the unbalance measurement results and a wheel dimension, more particularly for example the wheel diameter or a rim diameter.

In a further preferred feature the holding brake is in the form of an electrically actuated brake, for example a solenoid brake, which is supplied with a current corresponding to the braking moment. Control of the braking current which is supplied to the holding brake can be effected for example by means of pulse width modulation.

Further objects, features and advantages of the invention will be apparent from the description hereinafter of a preferred embodiment thereof.

DESCRIPTION OF THE PREFERRED EMBODIMENT

Figure 1:
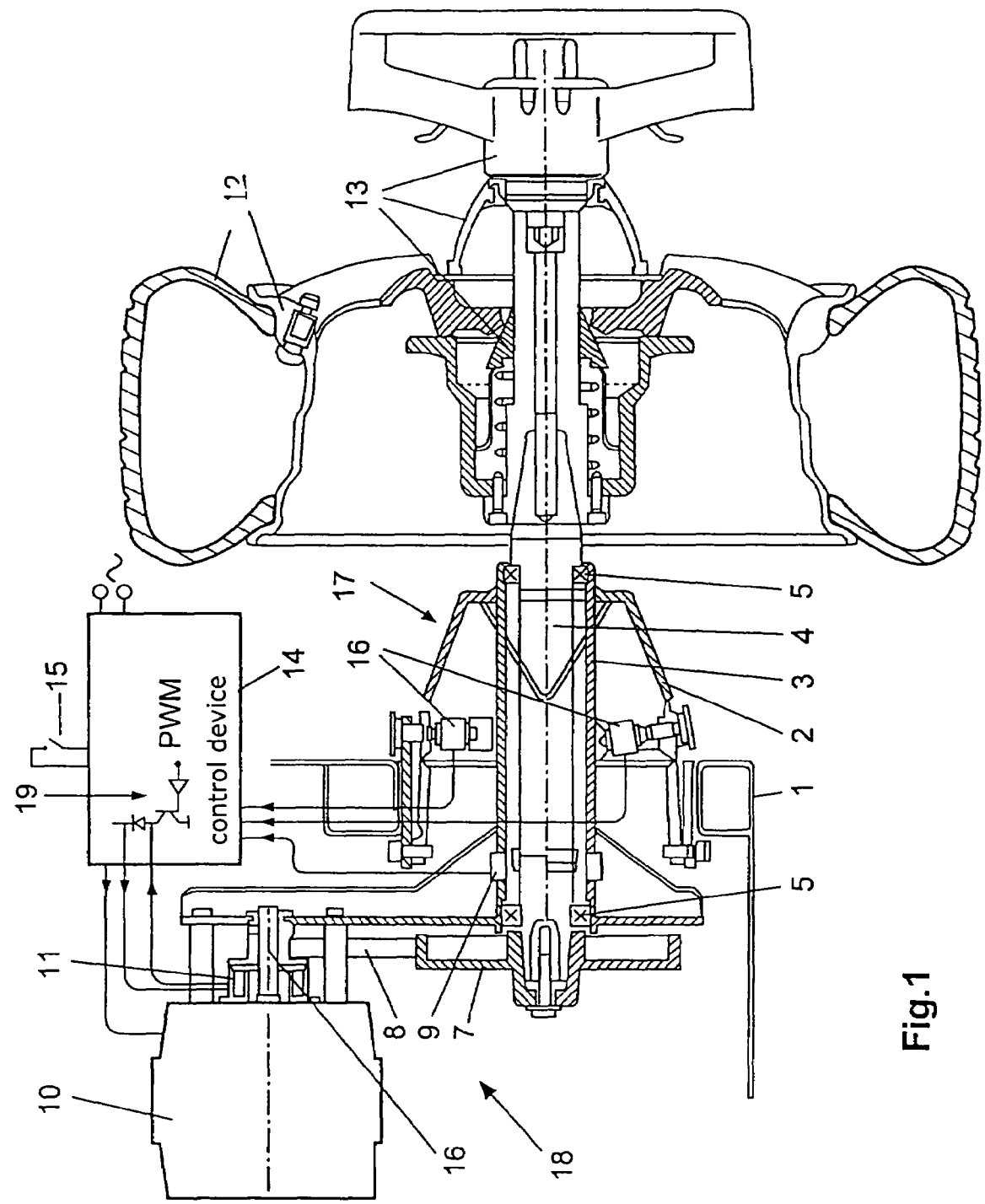
FIG. 1 is a partly sectional view of a balancing apparatus showing components for performing the method according to the invention.

Referring therefore to the drawing, a vehicle wheel 12 which is to be balanced is releasably fixed in centered relationship to a main shaft 4 of a balancing machine, by means of a clamping arrangement indicated generally at 13. This configurational assembly is generally known and therefore does not need to be described in greater detail herein.

The main shaft 4 of the balancing machine is supported rotatably in bearings indicated generally at 5, in a measuring device 17 mounted to a machine housing 1 of the balancing machine. The measuring device 17 for that purpose includes an oscillatable mounting arrangement 2 with a force-transmission structure for the main shaft 4. The main shaft 4 is held in the bearings 5 rotatably in a tube 3 forming part of the mounting arrangement 2. The measuring device 17 is described in greater detail in DE 198 44 975 C2, to which reference is therefore directed for appropriate incorporation of the contents herein.

To carry out an unbalance measuring procedure in which the values required for appropriately balancing the wheel 12 are ascertained, the main shaft 4 with the vehicle wheel 12 fixed thereto are driven in rotation by a drive arrangement generally indicated at 18.

The drive arrangement 18 includes an electric motor 10, the power supply of which is effected by way of a control device 14. For example, the control device 14, for setting the motor current, may include a system which is disclosed in DE 100 00 235 A1, to which reference is appropriately directed for incorporation of the contents herein. An output shaft 16 of the electric motor 10 transmits the drive moment of the motor by way of a belt transmission comprising a belt 8 and a belt pulley 7 to the main shaft 4. The belt transmission provides a step-down ratio from the output shaft 16 of the electric motor 10 to the main shaft 4.

The operation of measuring unbalance of the wheel 12 is effected by the main shaft 4 with the wheel 12 fixed thereto being accelerated to a rotary speed for measuring unbalance, referred to as the measurement speed. The forces generated as a consequence of unbalance of the motor vehicle wheel 12 are detected by measuring transducers 6 of the measuring device 17 and corresponding measurement signals are passed to the control device 14 and an evaluation device which can be provided in the control device 14. To ascertain the rotational angular position of the wheel 12 a rotational angle sensor 9 which detects the respective rotational angular increments of the main shaft 4 and passes corresponding signals to the control device 14 and the evaluation device is also provided in the measuring device 17.

To decelerate the main shaft 4 and the motor vehicle wheel 12 mounted thereto, after the unbalance measuring run has been carried out, the torque produced by the electric motor 10 is reversed, for example as described in DE 101 60 955 A1, DE 196 36 267 C2 or DE 196 36 268 C2, to which reference is accordingly directed for appropriate incorporation of the contents thereof. In that situation the main shaft 4 and the wheel 12 are subjected to a braking effect and are then stopped in the above-mentioned rotational balancing position for performing the wheel balancing operation. Stoppage of the main shaft 4 can be detected by means of the rotational angle sensor 9. The sensor 9 then for example does not supply the control device 14 with any changing angular signals.

The machine further includes a holding brake 11 for blocking the main shaft 4 and the wheel 12 mounted thereon in that rotational balancing position. The holding brake 11 is to be actuated, preferably electrically, when the main shaft 4 is in its stopped condition. The holding brake 11 can thus be in the form of an electrically actuated brake, for example a solenoid brake. The holding brake 11 is actuated by the control device 14 as soon as the latter has detected that the main shaft 4 with the wheel 12 mounted thereon is in the stopped condition after the unbalance measuring run. In that case, the holding braking moment which is provided by the holding brake 11 can be set to a specific value which depends on the respective motor vehicle wheel 12 being measured. To produce the appropriate holding braking moment with which the main shaft 4 and the vehicle wheel 12 are fixed in the desired rotational angular position, the control device 14 supplies the holding brake 11 with a given appropriate braking current. That braking current can be set in dependence on the measurement signals supplied by the measuring sensors 6 in the unbalance measuring run, and the associated rotational angle signals supplied by the rotational angle sensor 9. It is possible to calculate therefrom in the appropriate fashion the magnitude of a static unbalance of the wheel 12, in the evaluation device of the control device 14. The braking current for the holding brake 11 can thus be suitably set in dependence on that static unbalance and a dimension of the wheel 12, for example the wheel diameter or a rim diameter of the wheel. The holding braking moment is proportional to that braking current.

The braking current can be set by a pulse width modulation (PWM) device 19 provided in the control device 14.

In the illustrated embodiment, the holding brake 11 is disposed between the belt transmission 7, 8 and the electric motor 10 and can be fixed to the housing of the electric motor 10. As illustrated, the holding brake 11 acts directly on the output shaft 16 of the electric motor 10 at a location between the belt transmission and the electric motor 10. It will be appreciated however that it is also possible for the location at which the holding brake 11 is operative to produce the holding braking moment to be at a different position in the assembly, and the holding brake 11 can thus be disposed at another location. For example, the location at which the holding brake 11 is operative to act on the output shaft 16 of the electric motor 10 can be at a location which in the illustrated embodiment is to the right of the belt transmission 7, 8, as looking at the drawing.

The action of the holding brake 11 on the output shaft 16 advantageously provides that the braking moment afforded acts with the transmission factor or ratio of the belt transmission on the main shaft 4 and the motor vehicle wheel 12 fixed thereto. It will be further appreciated that the holding brake 11 can also be caused to act directly at the main shaft 4.

As the holding brake 11 is brought into operation only when the vehicle wheel 12 and the main shaft 4 carrying same are in a stopped condition, the holding brake 11 is subjected to only a small amount of wear. The holding braking moment which is produced by the holding brake 11 is of the order of magnitude of Nm, for example 3 Nm. As already discussed hereinbefore, the actual value of the holding braking moment applied by the brake 11 depends on the nature and characteristics of the vehicle wheel 12 and the magnitude of its static unbalance.

The holding braking moment can also be set automatically to a given value or within a given range of values. That can ensure that autonomous rotation of the wheel out of its set rotational balancing position due to static unbalances which are generally to be found in the case of motor vehicle wheels or in the case of certain types of motor vehicle wheels is avoided. The braking moment is set at such a low value that the wheel can be rotated from that set rotational balancing position in which it is retained by the holding braking moment, into another rotational angular position. For example, in the case of wheels for goods vehicles and trucks, the value of the braking moment is about 3 Nm, as stated above.

The braking moment which is produced by the holding brake 11 is of such a magnitude in terms of an upper limit thereof that the wheel 12 can be rotated by hand into another rotational angular position, for example into a second rotational balancing position for performing a further balancing operation on the wheel when it is in that position.

As will be readily appreciated, a foot pedal or switch for triggering the holding brake 11 is not required as the holding brake 11 is actuated automatically and under program control after the main shaft 4 and the vehicle wheel 12 fixed thereto have reached a stopped condition. Reference numeral 15 in the drawing denotes an on/off button or switch for switching on the unbalance measuring operation and possibly for switching off a respective operating mode function, for example for switching off the braking function of the holding brake 11.

Actuation of the holding brake 11, or the supply of current thereto for actuation thereof, can be limited in respect of time so that it is protected from an excessive rise in temperature.

It will be seen therefore that, in the stopped condition of the wheel, which is detected by the electronic evaluation system of the balancing machine, in the rotational balancing position in which the wheel is to be subjected to a suitable balancing operation, the wheel is subjected automatically by the electronic system of the machine to a holding braking moment which is preferably derived from unbalance measurement and at least one wheel dimension, whereby the wheel is at least substantially prevented from rotating of its own accord as a consequence of its static unbalance acting thereon.

It will be appreciated that the above-described method and apparatus of the invention have been set forth solely by way of example and illustration of the principles of the invention and that various modifications and alterations may be made therein without thereby departing from the spirit and scope of the invention.

What is claimed is:

1. A method of balancing a vehicle wheel, wherein after an unbalance measuring run is performed with the wheel when fixed to a main shaft of a balancing machine the wheel is stopped in a given rotational angular position for a balancing operation to be carried out on the wheel, by braking the rotary movement of the wheel, and when the wheel is in a stopped condition after unbalance measurement an automatic holding braking moment caused by the balancing machine electronic system is caused to act on the wheel, the holding braking moment being operative to prevent autonomous rotation of the wheel by virtue of its static unbalance;

wherein said holding braking moment is of an absolute value that is less than a torque which can be applied to the wheel by hand and with which the wheel is rotatable out of the stopped position.

2. A method as set forth in claim 1 wherein the holding braking moment is of a magnitude determined from the measurement results of unbalance measurement and the diameter of the wheel.

3. A method as set forth in claim 1 wherein the holding braking moment is of a magnitude determined from the measurement results of unbalance measurement and a rim diameter of the wheel.

4. A method as set forth in claim 1 wherein said static wheel unbalance is calculated from the measurement results of the unbalance measurement operation for determining the holding braking moment.

5. Apparatus for balancing a vehicle wheel comprising a main shaft, means for fixing the wheel to be balanced on the main shaft, a measuring means for measuring wheel unbalance, an evaluation means operable to evaluate the measurement results to determine a balancing operation to be carried out on the wheel, a drive means operable to drive the wheel in rotation and to brake the rotary movement of the wheel, an electrically actuated holding brake for holding the wheel in a given rotational angular position, and a control means adapted to detect stoppage of the main shaft after a wheel unbalance measuring run and adapted to produce a holding braking moment of said holding brake of a magnitude such that autonomous rotation of the wheel by virtue of its static unbalance is prevented.

6. Apparatus as set forth in claim 5 including means for determining the magnitude of the holding braking moment of said holding brake from the measurement results of said measuring means and at least one wheel dimension.

7. Apparatus as set forth in claim 5 wherein said drive means has an electric motor having an output shaft, and wherein said holding brake is adapted to act at said output shaft of the electric motor.

8. Apparatus as set forth in claim 5 wherein said holding brake is a solenoid brake.

9. Apparatus as set forth in claim 8 including means for controlling the braking current supplied to said holding brake by means of pulse width modulation, for setting the braking moment of said holding brake.

10. Apparatus as set forth in claim 5 including a rotational angle sensor adapted to detect a respective rotational angular position of said main shaft, and means connecting said rotational angle sensor to said control means, for detecting the stopped condition of the main shaft.

11. A method of balancing a vehicle wheel, wherein:
the wheel to be balanced is fixed to a main shaft of a balancing machine,
an unbalanced measuring run is performed and thereafter the wheel is stopped in a given rotational angular position for a balancing operation to be carried out on the wheel, by braking the rotary movement of the wheel, and
when the wheel is in a stopped condition after unbalance measurement an automatic holding braking moment caused by the balancing machine electronic system is caused to act on the wheel, the holding braking moment being operative to prevent autonomous rotation of the wheel by virtue of its static unbalance;
wherein said holding braking moment is of an absolute value that is less than a torque which can be applied to the wheel by hand and with which the wheel is rotatable out of the stopped position.

12. A method as set forth in claim 11 wherein the holding braking moment is of a magnitude determined from the measurement results of unbalance measurement and the diameter of the wheel.

13. A method as set forth in claim 11 wherein the holding braking moment is of a magnitude determined from the measurement results of unbalance measurement and a rim diameter of the wheel.

14. A method as set forth in claim 11 wherein said static wheel unbalance is calculated from the measurement results of the unbalance measurement operation for determining the holding braking moment.

* * * * *